(12) United States Patent
Kammer

(10) Patent No.: US 8,583,039 B2
(45) Date of Patent: Nov. 12, 2013

(54) DATA PRIORITIZATION AND DISTRIBUTION LIMITATION SYSTEM AND METHOD

(75) Inventor: David Kammer, Seattle, WA (US)

(73) Assignee: PALM, Inc., Sunnyvale, CA (US)

( * ) Notice: Subject to any disclaimer, the term of this patent is extended or adjusted under 35 U.S.C. 154(b) by 465 days.

(21) Appl. No.: 11/823,850

(22) Filed: Jun. 28, 2007

(65) Prior Publication Data

US 2008/0014988 A1    Jan. 17, 2008

Related U.S. Application Data

(63) Continuation of application No. 10/006,952, filed on Nov. 5, 2001, now abandoned.

(51) Int. Cl.
| | |
|---|---|
| H04B 7/00 | (2006.01) |
| H04W 24/00 | (2009.01) |
| H04W 4/00 | (2009.01) |
| G06F 15/16 | (2006.01) |
| G06F 15/177 | (2006.01) |

(52) U.S. Cl.
USPC ............ 455/41.2; 455/456.1; 455/456.6; 455/457; 709/227; 715/733; 715/734; 715/737; 370/310; 370/328; 370/338

(58) Field of Classification Search
USPC .......... 455/456, 41.1–41.3, 435.1–435.3, 455/456.1–457; 715/733–737; 370/310, 370/328–338
See application file for complete search history.

(56) References Cited

U.S. PATENT DOCUMENTS

| | | | |
|---|---|---|---|
| 4,907,290 | A | 3/1990 | Crompton |
| 5,010,547 | A | 4/1991 | Johnson et al. |
| 5,012,219 | A | 4/1991 | Henry |
| 5,075,684 | A | 12/1991 | DeLuca |
| 5,359,317 | A | 10/1994 | Gomez et al. |
| 5,394,140 | A | 2/1995 | Wong et al. |
| 5,430,436 | A | 7/1995 | Fennell |
| 5,594,796 | A | 1/1997 | Grube et al. |
| 5,612,682 | A | 3/1997 | DeLuca et al. |
| 5,650,776 | A | 7/1997 | Mitchell et al. |
| 5,699,244 | A | 12/1997 | Clark, Jr. et al. |
| 5,705,995 | A | 1/1998 | Laflin et al. |
| 5,736,982 | A * | 4/1998 | Suzuki et al. ............... 715/706 |
| 5,850,187 | A | 12/1998 | Carrender et al. |

(Continued)

FOREIGN PATENT DOCUMENTS

| | | |
|---|---|---|
| EP | 1494488 | 1/2005 |
| KR | 2001 0109963 | 12/2001 |

(Continued)

OTHER PUBLICATIONS

U.S. Appl. No. 11/809,198, filed May 31, 2007, Blight et al.

(Continued)

Primary Examiner — Matthew Sams

(57) ABSTRACT

A method of communicating between a handheld computer and other local area computing devices having wireless communication capability includes providing a handheld computer and identifying a plurality of other local area computing devices having wireless communication capability. The method further includes creating an identifier for one or more of the plurality of other local area computing devices and listing each identifier on a display. The list is sorted in order of at least one of distance and direction from the handheld computer.

20 Claims, 4 Drawing Sheets

(56) References Cited

U.S. PATENT DOCUMENTS

| | | |
|---|---|---|
| 5,875,434 A | 2/1999 | Matsuoka et al. |
| 5,884,168 A | 3/1999 | Kolev et al. |
| 5,901,358 A * | 5/1999 | Petty et al. ............... 455/456.2 |
| 5,903,852 A | 5/1999 | Schaupp, Jr. et al. |
| 5,929,848 A | 7/1999 | Albukerk et al. |
| 5,938,721 A | 8/1999 | Dussell et al. |
| 5,958,006 A | 9/1999 | Eggleston et al. |
| 5,974,330 A * | 10/1999 | Negishi ............... 455/457 |
| 6,016,476 A | 1/2000 | Maes et al. |
| 6,020,881 A * | 2/2000 | Naughton et al. ............ 715/740 |
| 6,047,579 A | 4/2000 | Schmitz |
| 6,061,561 A | 5/2000 | Alanara et al. |
| 6,104,291 A | 8/2000 | Beauvillier et al. |
| 6,111,538 A | 8/2000 | Schuchman et al. |
| 6,157,630 A | 12/2000 | Adler et al. |
| 6,177,905 B1 | 1/2001 | Welch |
| 6,182,010 B1 | 1/2001 | Berstis |
| 6,182,221 B1 | 1/2001 | Hsu et al. |
| 6,243,689 B1 | 6/2001 | Norton |
| 6,246,376 B1 * | 6/2001 | Bork et al. ............... 343/760 |
| 6,259,405 B1 | 7/2001 | Stewart et al. |
| 6,297,737 B1 | 10/2001 | Irvin |
| 6,307,919 B1 | 10/2001 | Yoked |
| 6,313,745 B1 | 11/2001 | Suzuki |
| 6,317,682 B1 * | 11/2001 | Ogura et al. ............... 701/117 |
| 6,346,881 B1 | 2/2002 | Davidson |
| 6,360,101 B1 | 3/2002 | Irvin |
| 6,389,290 B1 | 5/2002 | Kikinis et al. |
| 6,404,761 B1 | 6/2002 | Snelling et al. |
| 6,424,845 B1 | 7/2002 | Emmoft et al. |
| 6,456,234 B1 | 9/2002 | Johnson |
| 6,487,180 B1 | 11/2002 | Borgstahl et al. |
| 6,542,750 B2 * | 4/2003 | Hendrey et al. ............ 455/456.1 |
| 6,601,093 B1 | 7/2003 | Peters |
| 6,622,018 B1 * | 9/2003 | Erekson ............... 455/420 |
| 6,678,516 B2 * | 1/2004 | Nordman et al. .......... 455/414.1 |
| 6,681,108 B1 | 1/2004 | Terry et al. |
| 6,687,608 B2 | 2/2004 | Sugimoto et al. |
| 6,731,613 B1 | 5/2004 | Provance |
| 6,757,718 B1 | 6/2004 | Halverson et al. |
| 6,771,966 B1 * | 8/2004 | Chow ............... 455/446 |
| 6,772,331 B1 | 8/2004 | Hind et al. |
| 6,816,460 B1 * | 11/2004 | Ahmed et al. ............... 370/238 |
| 6,831,563 B1 * | 12/2004 | Contractor ............... 340/573.1 |
| 6,832,178 B1 | 12/2004 | Fernandez et al. |
| 6,847,823 B2 | 1/2005 | Lehikoinen et al. |
| 6,885,362 B2 * | 4/2005 | Suomela ............... 345/156 |
| 6,907,134 B1 | 6/2005 | Yamada et al. |
| 6,920,328 B2 | 7/2005 | Wollrab |
| 6,934,664 B1 | 8/2005 | Webb et al. |
| 6,941,270 B1 | 9/2005 | Hannula |
| 6,950,645 B1 * | 9/2005 | Kammer et al. ............ 455/343.1 |
| 6,982,962 B1 | 1/2006 | Lunsford et al. |
| 7,006,453 B1 * | 2/2006 | Ahmed et al. ............... 370/255 |
| 7,006,817 B2 | 2/2006 | Awada et al. |
| 7,010,290 B2 * | 3/2006 | Dent ............... 455/414.1 |
| 7,039,445 B1 * | 5/2006 | Yoshizawa ............... 455/575.7 |
| 7,050,816 B2 * | 5/2006 | Fukui et al. ............... 455/456.1 |
| 7,084,758 B1 | 8/2006 | Cole |
| 7,103,370 B1 | 9/2006 | Creemer |
| 7,164,885 B2 * | 1/2007 | Jonsson et al. ............... 455/41.2 |
| 7,212,827 B1 | 5/2007 | Veschl |
| 7,227,529 B2 * | 6/2007 | Suomela ............... 345/156 |
| 7,231,605 B1 * | 6/2007 | Ramakesavan ............... 715/734 |
| 7,266,379 B2 | 9/2007 | Blight et al. |
| 7,274,299 B2 | 9/2007 | Osman |
| 7,299,490 B2 * | 11/2007 | Berkema et al. ............... 726/2 |
| 7,336,964 B2 | 2/2008 | Casey |
| 7,356,347 B1 * | 4/2008 | Kammer ............... 455/517 |
| 7,360,248 B1 | 4/2008 | Kanevsky et al. |
| 7,376,098 B2 * | 5/2008 | Loeffler et al. ............... 370/329 |
| 7,385,718 B2 * | 6/2008 | Berkema et al. ............... 358/1.15 |
| 7,424,447 B2 | 9/2008 | Fuzell-Casey et al. |
| 7,529,537 B2 * | 5/2009 | Ford et al. ............... 455/404.1 |
| 7,583,972 B2 | 9/2009 | Clipsham |
| 7,613,427 B2 | 11/2009 | Blight et al. |
| 7,613,428 B2 | 11/2009 | Blight et al. |
| 7,805,719 B2 | 9/2010 | O'Neill |
| 7,970,417 B2 * | 6/2011 | Chang et al. ............... 455/456.3 |
| 2002/0010617 A1 | 1/2002 | Hamaguchi et al. |
| 2002/0019584 A1 | 2/2002 | Schulze et al. |
| 2002/0036991 A1 * | 3/2002 | Inoue ............... 370/328 |
| 2002/0061031 A1 | 5/2002 | Sugar et al. |
| 2002/0078075 A1 | 6/2002 | Colson et al. |
| 2002/0086680 A1 | 7/2002 | Hunzinger |
| 2002/0107024 A1 * | 8/2002 | Dev Roy ............... 455/447 |
| 2002/0136184 A1 | 9/2002 | Liang et al. |
| 2002/0147717 A1 | 10/2002 | Barros et al. |
| 2002/0163895 A1 * | 11/2002 | Haller et al. ............... 370/335 |
| 2002/0164996 A1 | 11/2002 | Dorenbosch ............... 455/456 |
| 2002/0165006 A1 * | 11/2002 | Haller et al. ............... 455/556 |
| 2002/0184331 A1 | 12/2002 | Blight et al. |
| 2002/0184418 A1 | 12/2002 | Blight |
| 2002/0194498 A1 | 12/2002 | Blight et al. |
| 2003/0001883 A1 * | 1/2003 | Wang ............... 345/736 |
| 2003/0022682 A1 | 1/2003 | Weston |
| 2003/0036350 A1 * | 2/2003 | Jonsson et al. ............... 455/41 |
| 2003/0054846 A1 * | 3/2003 | Parry ............... 455/517 |
| 2003/0087602 A1 | 5/2003 | Kammer |
| 2003/0149662 A1 * | 8/2003 | Shore ............... 705/39 |
| 2004/0176107 A1 | 9/2004 | Chadha |
| 2004/0193499 A1 * | 9/2004 | Ortiz et al. ............... 705/17 |
| 2004/0203931 A1 * | 10/2004 | Karaoguz ............... 455/457 |
| 2004/0207522 A1 | 10/2004 | McGee et al. |
| 2005/0012611 A1 | 1/2005 | Osman |
| 2005/0227711 A1 | 10/2005 | Orwant et al. |
| 2006/0061488 A1 | 3/2006 | Dunton |
| 2006/0095348 A1 | 5/2006 | Jones et al. |
| 2007/0077889 A1 | 4/2007 | Blight et al. |
| 2007/0091861 A1 | 4/2007 | Gupta et al. |
| 2007/0149208 A1 | 6/2007 | Syrbe |
| 2007/0185980 A1 | 8/2007 | Abraham et al. |
| 2007/0192277 A1 | 8/2007 | Jackson |
| 2007/0200732 A1 | 8/2007 | Bachmaier |
| 2007/0202886 A1 | 8/2007 | Dhebri et al. |
| 2007/0207733 A1 | 9/2007 | Wong et al. |
| 2007/0225004 A1 | 9/2007 | Tang et al. |
| 2007/0271367 A1 | 11/2007 | Yardeni et al. |
| 2008/0020786 A1 | 1/2008 | Smith et al. |
| 2008/0021637 A1 | 1/2008 | Staton et al. |
| 2008/0036653 A1 | 2/2008 | Huston |
| 2008/0045173 A1 | 2/2008 | Park et al. |
| 2008/0045236 A1 | 2/2008 | Nahon et al. |
| 2008/0125102 A1 | 5/2008 | Abel et al. |
| 2008/0195312 A1 | 8/2008 | Aaron et al. |
| 2009/0061870 A1 | 3/2009 | Finkelstein et al. |
| 2009/0209228 A1 * | 8/2009 | Ford et al. ............... 455/404.2 |
| 2009/0298511 A1 | 12/2009 | Paulson |
| 2011/0092227 A1 * | 4/2011 | Phukan ............... 455/456.3 |

FOREIGN PATENT DOCUMENTS

| | | |
|---|---|---|
| KR | 2005 0087189 | 8/2005 |
| KR | 2005 0095477 | 9/2005 |
| KR | 2006 0008100 | 1/2006 |
| WO | WO 2007/118125 | 10/2007 |
| WO | WO 2008/027836 A2 | 3/2008 |

OTHER PUBLICATIONS

U.S. Appl. No. 11/706,872, filed Feb. 15, 2007, Wong et al.
U.S. Appl. No. 11/540,909, filed Sep. 29, 2006, Blight et al.
U.S. Appl. No. 10/006,952, filed Nov. 5, 2001, Kammer.
"New Riverside University Dictionary", published by The Riverside Publishing Company, Copyright 1984 by Houghton Mifflin Company, p. 81.
Skyhook Wireless, "How It Works", printed from internet address: http://developer.skyhookwireless.com/how-it-works/, on Apr. 12, 2007, 2 pages.
Palm™ m505 Handheld, printed from internet address: http:/www.palm.com/products/palmm505/ on Sep. 20, 2001 (5 views).
U.S. Appl. No. 11/428,532, filed Jul. 3, 2006, Gupta et al.
U.S. Appl. No. 11/897,240, filed Aug. 29, 2007, Finkelstein et al.

(56) References Cited

OTHER PUBLICATIONS

US Office Action on U.S. Appl. No. 11/809,198 mail date May 21, 2009, 19 pages.
US Office Action on U.S. Appl. No. 11/540,909 mail date Jun. 10, 2009, 11 pages.
Amendment and Reply on U.S. Appl. No. 11/809,198, filed Jul. 21, 2009, 4 pages.
Amendment and Reply on U.S. Appl. No. 11/540,909, filed Aug. 10, 2009, 5 pages.
U.S. Appl. No. 60/725,892 entitled "Wireless Connectivity User-Interface Features", filed Oct. 11, 2005, 3 pages.
Digital Cellular Telecommunications System (Phase 2) at Command Set for GSM Mobile Equipment (ME) (GSM 07.07 version 7.4.0 Release 1998), ETSI TS 100 916 V7.4.0 (Nov. 1999), 126 pages. Available via website: http://www.ctiforum.com/standard/standard/etsi/0707.pdf.
Digital Cellular Telecommunications System (Phase 2+); Specification of the SIM Application Toolkit for the Subscriber Identity Module—Mobile Equipment (SIM-ME) interface (GSM 11.14 Version 5.2.0, Dec. 1996), ETSI, 56 pages. Available via website: http://www.ttfn.net/techno/smartcards/GSM11-14V5-2-0.pdf.
Digital Cellular Telecommunications System (Phase 2+); General Description of a GSM Public Land Mobile Network (PLMN) (GSM 01.02 version 6.0.1 Release 1997), ETSI TS 101 622 V6.0.1 (Feb. 2001), 23 pages. Available via website: http://p3e.rats.fi/oh2mqk/GSM/GSM-01.02.pdf.
Fasbender, A. et al., "Any Network, Any Terminal, Anywhere", IEEE Personal Communications (Apr. 1999), pp. 22-30, IEEE Press.
Hadjiefthymiades, S. et al., "ESW4: enhanced scheme for WWW computing in wireless communication environments", ACM SIGCOMM Computer Communication Review (Oct. 1999), pp. 24-35, vol. 29, Issue 5, ACM Press.
Jing, J., et al., "Client Server Computing in Mobile Environments", ACM Computing Surveys, (Jul. 1999), pp. 117-156, vol. 31, Issue 2, ACM Press.
Notice of Allowance for U.S. Appl. No. 11/706,872, mail date Dec. 27, 2010, 7 pages.
Office Action for U.S. Appl. No. 12/167,137, mail date Nov. 8, 2010, 8 pages.
Office Action for U.S. Appl. No. 12/581,038, mail date Nov. 15, 2010, 11 pages.
Sevanto, J. et al., "Introducing quality-of-service and traffic classes in wireless mobile networks", Proceedings of the 1st ACM International workshop on Wireless mobile multimedia (1999), pp. 21-29, ACM Press.
International Search Report and Written Opinion from International Application No. PCT/US2009/045387 dated Feb. 17, 2010, 8 pages.
Office Action for U.S. Appl. No. 11/706,872, mail date Nov. 3, 2009, 9 pages.
Office Action for U.S. Appl. No. 11/706,872, mail date Apr. 26, 2010, 8 pages.
Office Action for U.S. Appl. No. 11/706,872, mail date Aug. 5, 2010, 9 pages.

\* cited by examiner

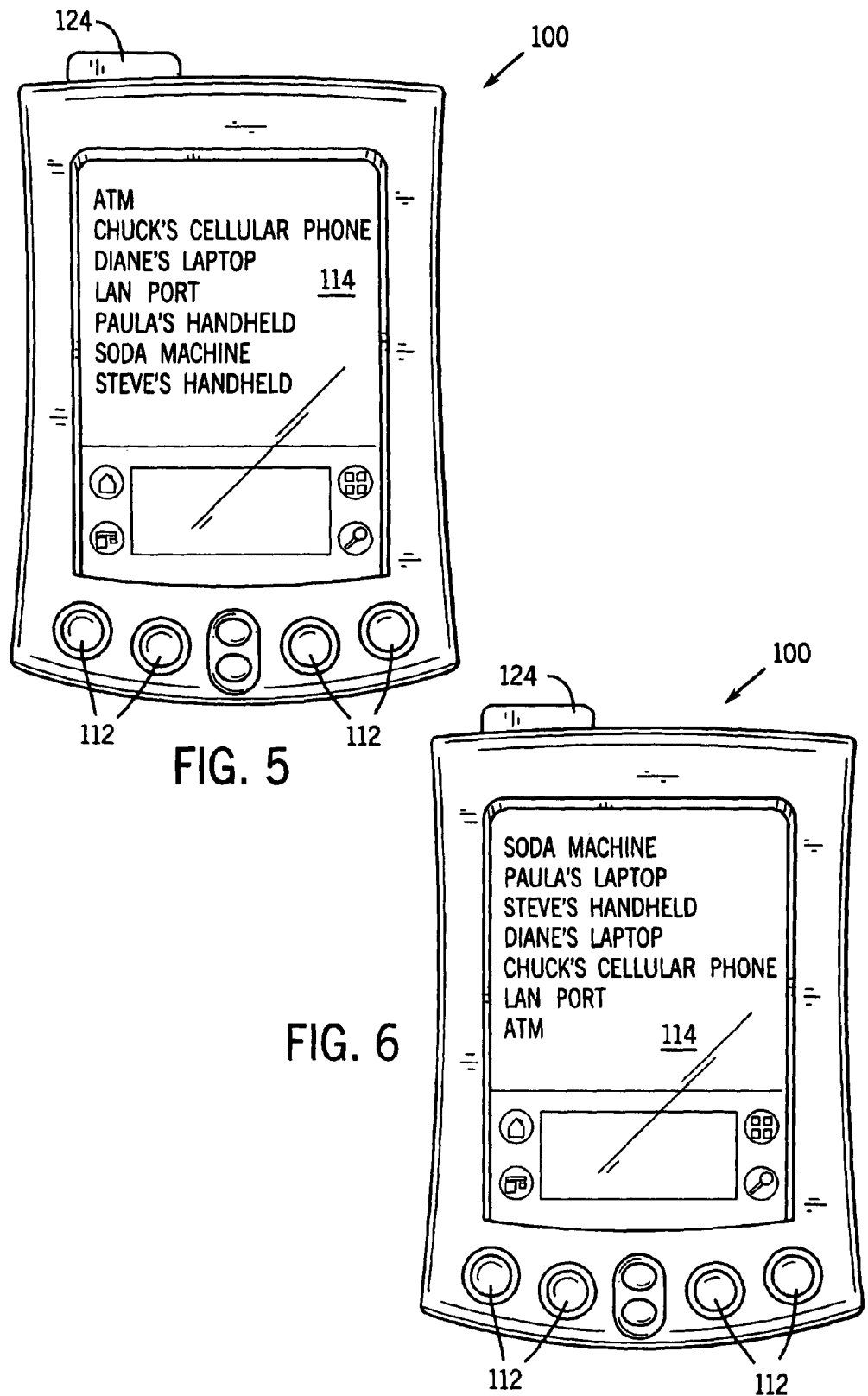

DATA PRIORITIZATION AND DISTRIBUTION LIMITATION SYSTEM AND METHOD

CROSS-REFERENCE TO RELATED APPLICATION

This application is a Continuation of U.S. application Ser. No. 10/006,952 filed Nov. 5, 2001, which is herein incorporated by reference in its entirety.

BACKGROUND

Handheld computing devices such as personal digital assistants or handheld computers generally provide some combination of personal information management, database functions, word processing and spreadsheets, as well as communications network connectivity, internet connectivity, voice memo recording, and telephony functions. Further, handheld computing devices may include local area wireless technology permitting communication with other computing devices within a local area.

Handheld computing devices that include local area wireless capabilities may communicate with other computing devices using protocols or standards such as but not limited to Bluetooth wireless technology, IEEE 802.11 architecture, or other relevant technologies or standards. Local area wireless communications are typically between devices located proximate one another, such as within twenty meters. The communication signals sent between the computing devices are typically radio frequency (RF) signals but may also include infrared or ultrasonic signals.

While handheld computing devices that include local area wireless communication capability may communicate with each other, they may also communicate with computing devices connected to land lines, such as a wired local area network access point, or other hardwired computing devices. Further, the wireless handheld computing devices may share information with other types of wireless electronic devices such as cellular phones or laptop computers.

Local area wireless communication capability permits computing devices to communicate and share information such as files with one another without the use of a wired or cellular network. Sharing information may involve one or both of transmitting and receiving information. A local area wireless connection may be used to interface with a wired computer network or to browse the internet utilizing a nearby computing device that is connected to the internet. Further, documents, business cards, computer files, and even voice communications may be communicated between multiple computing devices that are linked together in a wireless local area network. Further still, local wireless connectivity permits the synchronization of various computing devices such as handheld computers, cellular phones, and laptops without the use of wired connections or more complicated wireless computing protocols such as those used by cellular phones.

In order for handheld computing devices to communicate with one another and other computing devices via local area wireless technologies, the various devices and their users often desire to be able to accept or decline messages that are received, and preferably target outgoing messages to particular receiving devices, rather than indiscriminately broadcasting communications to all proximate wireless computing devices.

One way for computing devices to more selectively communicate with one another is for the user to select the device or devices to which a communication should be made prior to sending the communication. The device may then send the communication such that it is received only by the chosen computing devices rather than all computing devices within range of the transmitted signal. The number of computing devices within range of a computing device with a wireless transmitter may be large given the rapidly increasing use of local area wireless technologies and the long range of RF signals as compared to the infrared signals used by earlier devices.

Permitting the user to choose the local computing devices with which information should be shared presents difficulties if the number of possible receiving devices is large. A typical method of presenting the possible choices to the user would be to list the devices on a display associated with the user's handheld computer. The user may then scroll through the list or use a stylus to tap on the desired devices to which the user wishes to transmit information. However, as the number of possible devices grow large, the action required by the user becomes more cumbersome, as it may be necessary to scroll through a long list of local area devices, and choose one or more of them. Further, it may not be immediately apparent to the user which nearby computing device corresponds to the indicator shown on the user's computer device, making the selection more difficult.

Therefore, there is a need for a handheld computing device with local area wireless technology that permits the user to more easily choose other computing devices in the local area with which the user wishes to communicate. Further, there is a need for a more logical approach to selecting a group of one or more devices to which a wireless communication should be sent without individually selecting each device from a list.

The teachings herein extend to those embodiments that fall within the scope of the appended claims, regardless of whether they accomplish one or more of the above-mentioned needs.

SUMMARY

An exemplary embodiment relates to a method of communicating between a handheld computer and other local area computing devices having wireless communication capability. The method includes providing a handheld computer, identifying a number of other local area computing devices having wireless communication capability, creating an identifier for one or more of the plurality of other local area computing devices, and listing each identifier on a display, wherein the list is sorted in order of at least one of the distance and direction from the handheld computer.

Another exemplary embodiment relates to a method of sharing information between a handheld computer and a group of local area computing devices having wireless communication capability. The method includes specifying a distance, identifying one or more local area computing devices having wireless communication capability within the specified distance from the handheld computer, and transmitting a wireless message to the one or more local area computing devices having wireless communication capability within the specified distance.

A further exemplary embodiment relates to a local area wireless communication device. The local area wireless communication device includes a housing, a processor supported by the housing, a memory coupled to the processor, a transmitter supported by the housing, and a display. The processor instructs the display to list a plurality of other computing devices located within range of the transmitter, sorted in order of at least one of the distance and the direction from the wireless communication device.

A still further exemplary embodiment relates to a user interface for a handheld computer. The user interface includes a display providing a list of indicators corresponding to a plurality of local area computing devices with which communication is possible. The list is sorted by at least one of distance and direction from the handheld computer.

Alternative exemplary embodiments relate to other features and combination of features as may be generally recited in the claims.

BRIEF DESCRIPTION OF THE DRAWINGS

The invention will become more fully understood from the following detailed description, taken in conjunction with the accompanying drawings, wherein like reference numerals refer to like elements in which:

FIG. 5 is a front view of a handheld computer displaying a list of local area computing devices;

FIG. 6 is a front view of a handheld computer displaying a list of local area computing devices sorted by distance.

DETAILED DESCRIPTION OF THE EXEMPLARY EMBODIMENTS

Figure 1:
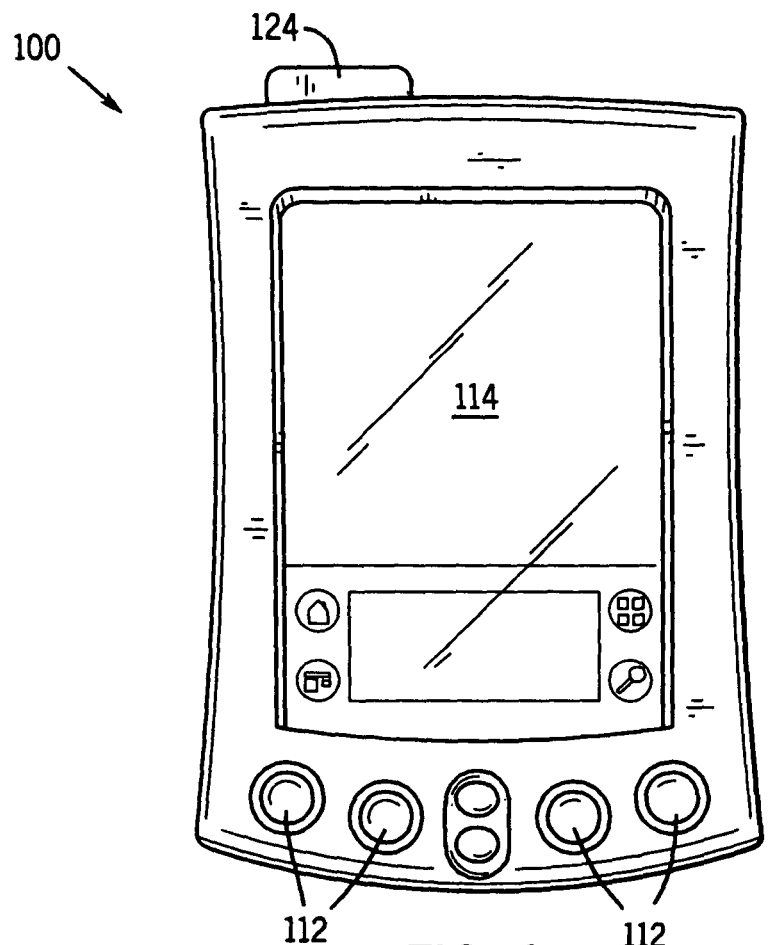
FIG. 1 is an exemplary front elevation view of a handheld computer.

Referring to FIG. 1, a portable electronic device, shown as, but not limited to, handheld computer 100 is depicted according to an exemplary embodiment. Handheld computer 100 may include Palm style computers manufactured by Palm, Inc., of Santa Clara, Calif. Other exemplary embodiments may include Windows CE handheld computers, or other handheld computers and personal digital assistants, as well as mobile telephones, and other mobile computing devices.

Preferably, handheld computer 100 includes memory, a processor, and interactive hardware and software that performs functions such as maintaining calendars, phone lists, task lists, notepads, calculator applications, spreadsheets, games, and other applications capable of running on a computing device. Further, handheld computer 100 may be configured for such functions as voice memo recording and play back, as well as communications network connectivity, internet connectivity and wireless telephony.

Handheld computer 100, depicted in FIG. 1, includes a plurality of input function keys 112 and a display 114 having graphical user interface features. Display 114 may be provided with a touch screen interface that allows a user to select and alter displayed content using a pointer, such as, but not limited to, a stylus 116 (see FIG. 2), a pen tip, a finger tip, or other pointing devices.

Handheld computer 100 may also include local area wireless technology to permit wireless communication with other portable electronic devices and computing devices that have compatible communication technology. The local area wireless technology may be Bluetooth or IEEE 802.11 compatible, or may support yet another wireless communication protocol.

Figure 2:
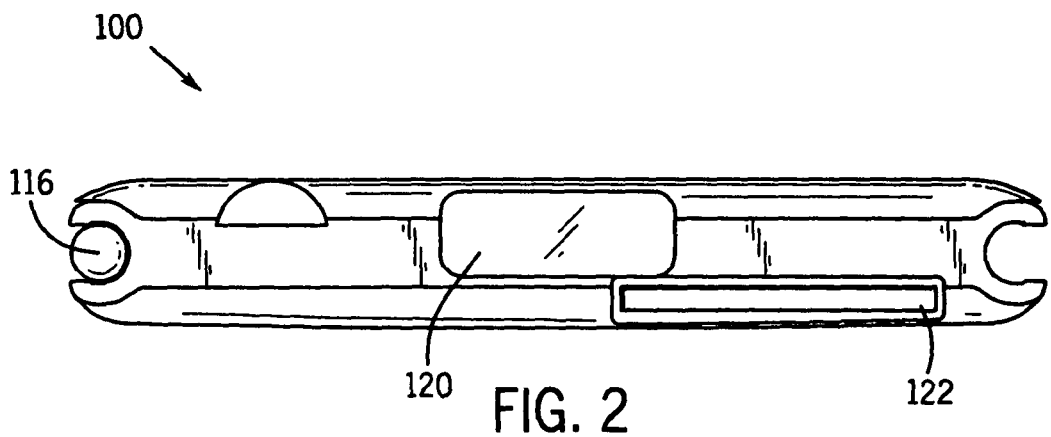
FIG. 2 is a top view of a handheld computer.
Figure 3:
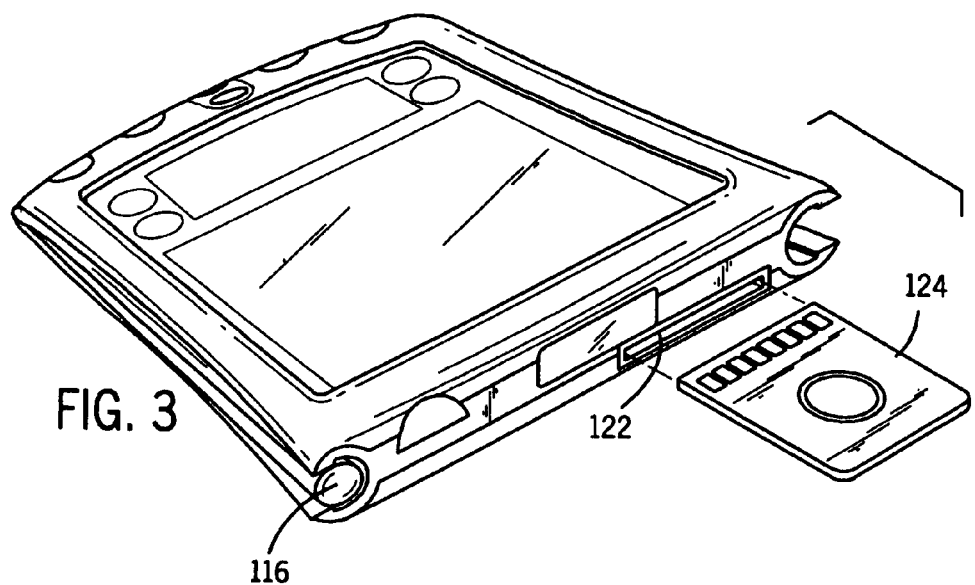
FIG. 3 is a perspective view of a handheld computer and expansion card.

To support local area wireless communications, handheld computer 100 may include wireless connectivity software integrated into the operating system or stored in memory of handheld computer 100 or further added via an expansion card or transferred from another computer or computer system. Further, to effectuate local area communications, handheld computer 100 may include an RF transceiver 124, or other electromagnetic reception and transmission device. RF transceiver 124 may be provided on handheld computer 100 as part of an expansion card or may alternatively be integrated into handheld computer 100. Referring to FIG. 2, handheld computer 100 may transmit and receive local area wireless communications via infrared port 120. Expansion card 124, including an RF transceiver, may be installed in handheld computer 100 via an expansion slot 122 used to house expansion cards such as, but not limited to, secure digital (SD) cards. Referring to FIG. 3, one such expansion card 124 is shown disposed proximate expansion card slot 122. An installed expansion card 124 that may be used for local area wireless communications is depicted in FIG. 1. RF transceiver 124 may be a Bluetooth transceiver, an IEEE 802.11 transceiver, or any of a variety of other RF, VHF, UHF, ultrasonic, or other wireless transceiver devices.

Figure 4:
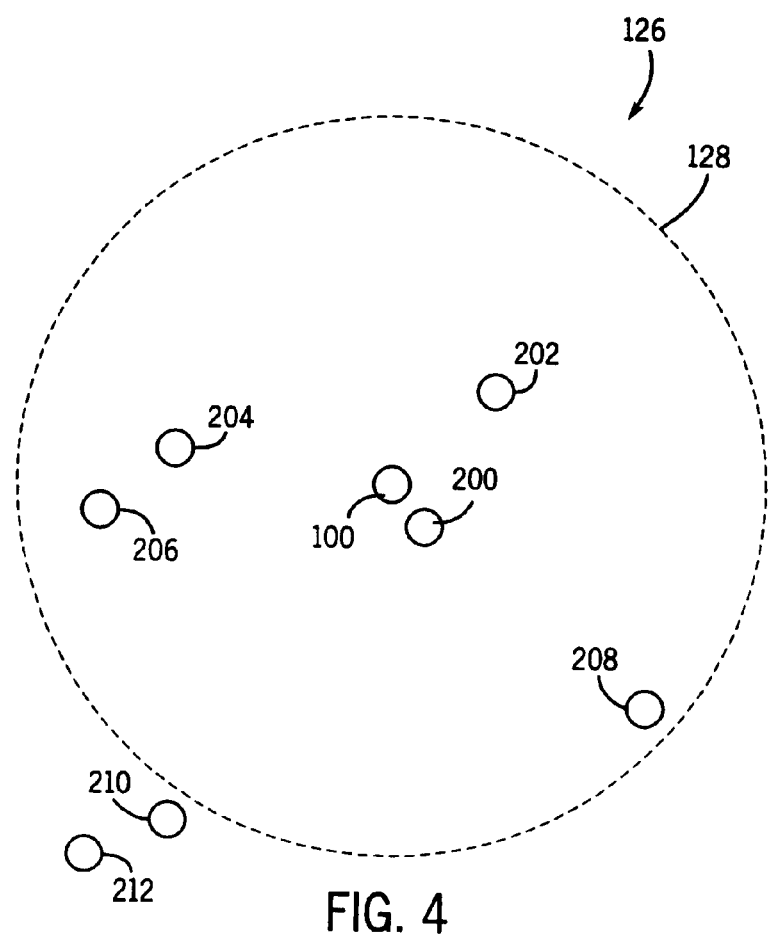
FIG. 4 is a schematic diagram of a local area containing various computing devices.

Referring to FIG. 4, handheld computer 100 may be capable of communicating with other computing devices within local area 126. In the exemplary situation of FIG. 4, handheld computer 100 may be able to communicate with various other local area computing devices such as, but not limited to computing devices having wireless communication capability such as soda machine 200, first handheld computer (Paula's Handheld) 202, second handheld computer (Steve's Handheld) 204, laptop computer (Diane's Laptop) 206, cellular phone (Chuck's Cellular Phone) 208, local area network (LAN) port 210, and automated teller machine (ATM) 212.

Referring to FIG. 5, handheld computer 100 may assign each of the other computing devices 200 through 212 a name to facilitate identification of possible communication devices by the user of handheld computer 100. The name or indicator associated with the other local area wireless devices 200-212 is descriptive in an exemplary embodiment rather than corresponding to a numerical computer address for the other devices. In the embodiment shown in FIG. 5, the device indicators include the name of the user of certain devices to facilitate identification. The list of other local area wireless devices may be placed on display 114 of handheld computer 100 for possible selection by the user. As shown on FIG. 5, the list may be sorted alphabetically by device indicator. In other embodiments, the list may be randomly set forth. If the user of handheld computer 100 wishes to communicate with soda machine 200, user may be required to scroll through a list of all local area computing devices, such as 200-212 to find and select soda machine 200.

Referring to FIG. 6, in an exemplary embodiment of the present invention, handheld computer 100 displays a list of local area wireless computing devices presented in order of distance from handheld computer 100. Because it is likely that the user of handheld computer 100 wishes to communicate with a device located proximate handheld computer 100, listing available devices in order of distance from handheld computer 100 will present the most likely desired choice by user at or near the top of the list, creating a more efficient selection process. For example, soda machine 200 is most proximate to handheld computer 100 and therefore is listed at the top of display 114, facilitating selection by user as compared to the list shown in FIG. 5. The more efficient ordering of selection possibilities is especially important with respect to devices such as handheld computer 100 because the limited space on display 114 may require scrolling through several pages of possible choices with less efficient ordering methodologies.

Handheld computer 100 may determine the distance to other local area computing devices 200 through 212 in a number of ways. In an exemplary embodiment, handheld computer 100 sends an electronic locator signal to other local devices and calculates the locations of the other devices utilizing the response time from the other devices. Such "electronic pinging" may be continuously done by handheld computer 100 without interaction from the user, and may elicit automatic responses from other local area computing devices 200 through 212.

The listing of devices with which the user may wish to communicate may be presented on display 114 of handheld computer 100 or may be presented utilizing other methodologies, such as an audible communication.

Figure 7:
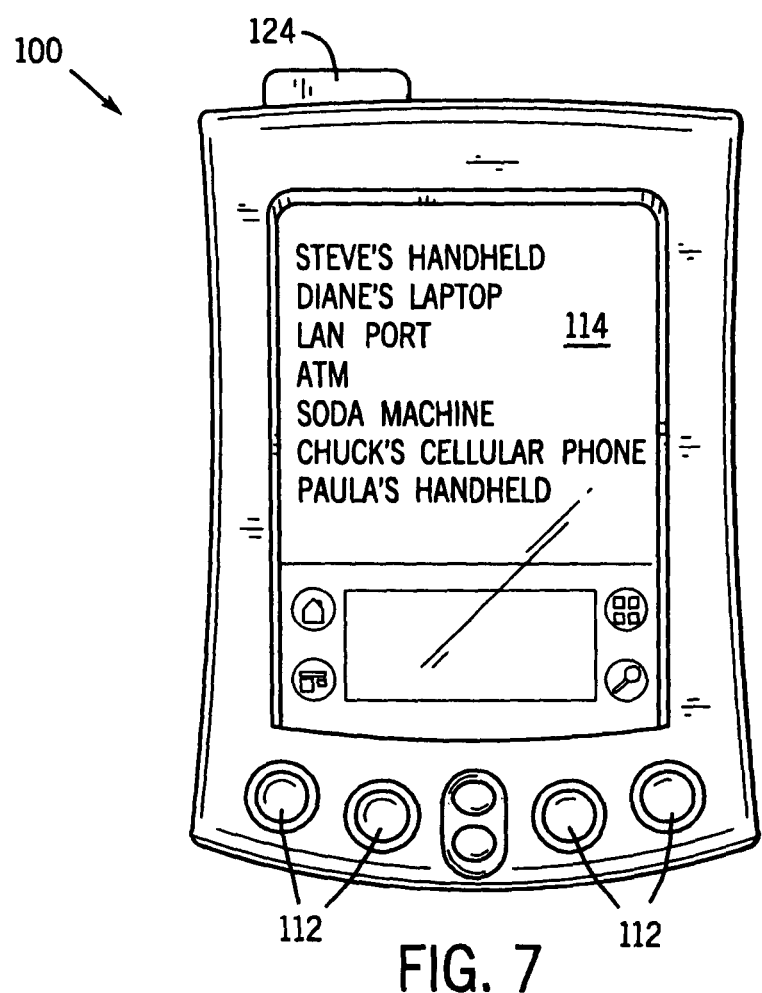
FIG. 7 is a front view of a handheld computer displaying a list of computing devices sorted in order of direction.

Referring to FIG. 7, in another embodiment, handheld computer 100 may present a directional listing of local area computing devices 200 through 212. For example, if handheld computer 100 is pointed directly at Steve's handheld 204, the list of communications choices presented by handheld computer 100 to the user may begin with Steve's handheld 204 and Diane's laptop 206 before listing the closer devices soda machine 200 and Paula's handheld 202 because the list is keyed to direction from handheld computer 100 rather than solely based on proximity.

A directional listing of local area wireless computing devices may be more useful than other list orders because it is likely that the user of handheld computer 100 will be pointing handheld computer 100 at the device with which the user wishes to share information. The directional information used for sorting the list of proximate devices may be acquired by handheld computer 100 through the electronic pinging of other local area computing devices 200 through 212.

Handheld computer 100 may utilize both distance and direction simultaneously to sort indicators of other computing devices 200 through 212. For example, a number of computing devices may be located at a similar distance, and accordingly handheld computer 100 may sort the list based first on distance from handheld computer 100, but secondly based on the direction from handheld computer 100 if necessary.

The user of handheld computer 100 may wish to choose a subset of devices with which to communicate out of the larger set of all local area wireless devices. One way of making such a selection would be to scroll through the list of all local area devices set forth on display 114 and choose each member of the subset of devices individually. Rather than performing such an individual selection process, in an exemplary embodiment, a distance metric may be used to select the subset of devices.

For example, user of handheld computer 100 may wish to send a message to all local area wireless devices within a particular radius of handheld computer 100, denoted by sub area 128 on FIG. 4. If user of handheld computer 100 wishes to share information with all local area wireless devices within sub area 128, a distance metric equal to the radius of sub area 128 maybe chosen such that communications will be effectuated between handheld computer 100 and wireless devices 200, 202, 204, 206, and 208 but not to and from wireless devices 210 and 212 which are outside sub area 128. In an exemplary embodiment, the user may be permitted to choose any distance metric for communicating with a desired sub-group of wireless devices within a particular radius of handheld computer 100.

The software used to permit the various display ordering and groupings of local area computing devices 200 through 212 may be part of an operating system, such as Palm OS, or may be a program loaded separately onto handheld computer 100. The software may be developed in any number of conventional programming languages. In other embodiments, the instructions may be carried out by hard wired circuitry or by a combination of circuitry and software.

The user interface and display methodologies described herein address the various needs of the conventional art by permitting efficient communication between local area wireless devices. By permitting a user of handheld computer 100 to list proximate devices categorized by distance or direction, or by permitting the grouping of devices by a distance metric, the user of handheld computer 100 may more efficiently communicate with other computing devices.

While the detailed drawings, specific examples, and particular formulations given describe exemplary embodiments, they serve the purpose of illustration only. The hardware and user interface configurations shown and described may differ depending on the chosen performance characteristics and physical characteristics of the computing devices. The systems shown and described are not limited to the precise details and conditions disclosed. Furthermore, other substitutions, modifications, changes, and omissions may be made in the design, operating conditions, and arrangement of the exemplary embodiments without departing from the scope of the invention as expressed in the appended claims.

What is claimed is:

1. A method for operating a computing device, the method being performed by one or more processors and comprising:
receiving data from a plurality of wireless computing devices within a first distance of the computing device;
presenting a plurality of alphanumeric device identifiers corresponding to the plurality of wireless computing devices on a display of the computing device, wherein presenting the plurality of alphanumeric device identifiers includes (i) enabling a user to configure one or more alphanumeric device identifiers that is presented on the display by assigning one or more names for the corresponding one or more wireless computing devices using input received from a user interface of the computing device, and (ii) displaying the one or more assigned names of the one or more wireless computing devices;
enabling a user to select a subset of devices, from the plurality of wireless computing devices that have been determined to be within the first distance of the computing device and that have a corresponding alphanumeric device identifier presented on the display, by receiving a selection input of a second distance that is smaller than the first distance from a user via a user input mechanism of the computing device, the selection input identifying the subset of the plurality of wireless computing devices that are within the second distance in which to send a communication to; and
in response to receiving the selection input that corresponds to the second distance, sending a communication to the subset of the plurality of wireless computing devices.

2. The method of claim 1, wherein sending the communication to the subset of the plurality of wireless computing devices comprises sending the communication via a local area wireless communication.

3. The method of claim 1, wherein displaying the one or more assigned names comprises replacing the one or more alphanumeric device identifiers with the one or more assigned names.

4. The method of claim 1, wherein sending the communication to the subset of the plurality of wireless computing devices comprises sending the communication via an IEEE communication protocol.

5. The method of claim 1, wherein sending the communication to the subset of the plurality of wireless computing devices comprises sending the communication via a Bluetooth protocol.

6. The method of claim 1, further comprising determining a distance of each of the plurality of wireless computing devices from the computing device by sending a locator signal to the plurality of wireless computing devices and determining a response time from the plurality of wireless computing devices.

7. The method of claim 1, wherein the computing device has telephony functionality and comprises input keys.

8. A computing device comprising:
a transceiver;
an input mechanism;
a display; and
a processor coupled to the transceiver, the input mechanism, and the display, the processor to:
receive data from a plurality of wireless computing devices within a first distance of the computing device;
present a plurality of alphanumeric device identifiers corresponding to the plurality of wireless computing devices on the display, wherein the processor presents the plurality of alphanumeric device identifiers by (i) enabling a user to configure one or more alphanumeric device identifiers that is presented on the display by assigning one or more names for the corresponding one or more wireless computing devices using input received from the input mechanism, and (ii) displaying the one or more assigned names of the one or more wireless computing devices;
enable a user to select a subset of devices, from the plurality of wireless computing devices that have been determined to be within the first distance of the computing device and that have a corresponding alphanumeric device identifier presented on the display, by receiving a selection input of a second distance that is smaller than the first distance from a user via a user input mechanism of the computing device, the selection input identifying the subset of the plurality of wireless computing devices that are within the second distance in which to send a communication to; and
in response to receiving the selection input that corresponds to the second distance, send a communication to the subset of the plurality of wireless computing devices.

9. The computing device of claim 8, wherein the processor sends communication to the subset of the plurality of wireless computing devices by sending the communication via a local area wireless communication.

10. The computing device of claim 8, wherein the processor displays the one or more assigned names by replacing the one or more alphanumeric device identifiers with the one or more assigned names.

11. The computing device of claim 8, wherein the processor sends communication to the subset of the plurality of wireless computing devices by sending the communication via an IEEE communication protocol.

12. The computing device of claim 8, wherein the processor sends communication to the subset of the plurality of wireless computing devices by sending the communication via a Bluetooth protocol.

13. The computing device of claim 8, wherein the processor further s determines a distance of each of the plurality of wireless computing devices from the computing device by sending a locator signal to the plurality of wireless computing devices and determining a response time from the plurality of wireless computing devices.

14. The computing device of claim 8, wherein the display is a touch-sensitive display.

15. A non-transitory computer readable medium storing instructions that, when executed by one or more processors, cause the one or more processors to perform steps comprising:
receiving data from a plurality of wireless computing devices within a first distance of the computing device;
presenting a plurality of alphanumeric device identifiers corresponding to the plurality of wireless computing devices on a display of the computing device, wherein presenting the plurality of alphanumeric device identifiers includes (i) enabling a user to configure one or more alphanumeric device identifiers that is presented on the display by assigning one or more names for the corresponding one or more wireless computing devices using input received from an input mechanism of the computing device, and (ii) displaying the one or more assigned names of the one or more wireless computing devices;
enabling a user to select a subset of device, from the plurality of wireless computing devices that have been determined to be within the first distance of the computing device and that have a corresponding alphanumeric device identifier presented on the display, by receiving a selection input of a second distance that is smaller than the first distance from a user via a user input mechanism of the computing device, the selection input identifying the subset of the plurality of wireless computing devices that are within the second distance in which to send a communication to; and
in response to receiving the selection input that corresponds to the second distance, sending a communication to the subset of the plurality of wireless computing devices.

16. The non-transitory computer readable medium of claim 15, wherein the instructions cause the one or more processors to send the communication to the subset of the plurality of wireless computing devices by sending the communication via a local area wireless communication.

17. The non-transitory computer readable medium of claim 15, wherein the instructions cause the one or more processors to display the one or more assigned names by replacing the one or more alphanumeric device identifiers with the one or more assigned names.

18. The non-transitory computer readable medium of claim 15, wherein the instructions cause the one or more processors to send the communication to the subset of the plurality of wireless computing devices by sending the communication via an IEEE communication protocol.

19. The non-transitory computer readable medium of claim 15, wherein the instructions cause the one or more processors to send the communication to the subset of the plurality of wireless computing devices by sending the communication via a Bluetooth protocol.

20. The non-transitory computer readable medium of claim 15, further storing instructions that cause the one or more processors determine a distance of each of the plurality of wireless computing devices from the computing device by sending a locator signal to the plurality of wireless computing devices and determining a response time from the plurality of wireless computing devices.

* * * * *

UNITED STATES PATENT AND TRADEMARK OFFICE
CERTIFICATE OF CORRECTION

| | |
|---|---|
| PATENT NO. | : 8,583,039 B2 |
| APPLICATION NO. | : 11/823850 |
| DATED | : November 12, 2013 |
| INVENTOR(S) | : David Kammer |

It is certified that error appears in the above-identified patent and that said Letters Patent is hereby corrected as shown below:

In the Claims:

In column 7, line 66, in Claim 13, delete "further s" and insert -- further --, therefor.

Signed and Sealed this
Twenty-third Day of September, 2014

Michelle K. Lee
*Deputy Director of the United States Patent and Trademark Office*